US011872426B2

(12) United States Patent
Witvoet et al.

(10) Patent No.: US 11,872,426 B2
(45) Date of Patent: Jan. 16, 2024

(54) PROFILE FOR HOSE RAMP, HOSE RAMP PROVIDED THEREWITH, AND ASSOCIATED METHOD

(71) Applicant: HYTRANS BEHEER B.V., Lemmer (NL)

(72) Inventors: Jan Johannes Witvoet, Leeuwarden (NL); Eelco Franciscus Zeinstra, Franeker (NL); Robert Dirk Hut, Wergea (NL)

(73) Assignee: HYTRANS BEHEER B.V., Lemmer (NL)

( * ) Notice: Subject to any disclaimer, the term of this patent is extended or adjusted under 35 U.S.C. 154(b) by 613 days.

(21) Appl. No.: 17/057,209

(22) PCT Filed: May 21, 2019

(86) PCT No.: PCT/NL2019/050295
§ 371 (c)(1),
(2) Date: Nov. 20, 2020

(87) PCT Pub. No.: WO2019/226047
PCT Pub. Date: Nov. 28, 2019

(65) Prior Publication Data

US 2021/0213314 A1 Jul. 15, 2021

(30) Foreign Application Priority Data

May 24, 2018 (NL) ..................................... 2020977
Sep. 26, 2018 (NL) ..................................... 2021712

(51) Int. Cl.
*A62C 33/06* (2006.01)

(52) U.S. Cl.
CPC .................................... *A62C 33/06* (2013.01)

(58) Field of Classification Search
CPC ................................ A62C 33/06; E01D 18/00
(Continued)

(56) References Cited

U.S. PATENT DOCUMENTS 71,026 A * 11/1867 Lewis .................... A62C 33/06 104/277
5,385,431 A 1/1995 Topf, Jr.
(Continued)

FOREIGN PATENT DOCUMENTS

DE 102011002270 A1 11/2011
EP 0917889 A1 5/1999
JP 3292910 B2 6/2002

OTHER PUBLICATIONS

International Search Report and Written Opinion for the International Patent Application No. PCT/NL2019/050295, dated Oct. 25, 2019, 14 pages.

*Primary Examiner* — Patrick F Brinson
(74) *Attorney, Agent, or Firm* — KDW Firm PLLC

(57) ABSTRACT

A profile for a hose ramp, a hose ramp provided with one or more of these profiles and a method for constructing a hose ramp. The profile includes a housing with a bottom part which rests on a ground surface during use, a first outer end provided with a first exit plane, and a second outer end provided with a second exit plane. A channel extends through the housing from the first exit plane to the second exit plane and is configured for passage of a hose. The channel is substantially provided with an oval shape. The first exit plane is provided at a first angle to the bottom part and the second exit plane is provided at a second angle to the bottom part, and the first and second angle differ from each other.

20 Claims, 5 Drawing Sheets

(58) Field of Classification Search
USPC ................................ 138/103, 105, 106, 110
See application file for complete search history.

(56) References Cited

U.S. PATENT DOCUMENTS 6,067,681 A * 5/2000 Zeinstra ................ A62C 33/06 104/275
6,481,036 B1 * 11/2002 Duvall .................... H02G 9/04 414/921
6,878,881 B1 * 4/2005 Henry ..................... H02G 9/04 174/101

* cited by examiner

PROFILE FOR HOSE RAMP, HOSE RAMP PROVIDED THEREWITH, AND ASSOCIATED METHOD

This is a national stage application filed under 35 U.S.C. § 371 of pending international application PCT/NL2019/050295, filed May 21, 2019, which claims priority to Netherlands Patent Application No. 2020977, filed May 24, 2018, and Netherlands Patent Application No. 2021712, filed Sep. 26, 2018, the entirety of which applications are hereby incorporated by reference herein.

The invention relates to a profile for a hose ramp. Such hose ramps are usually applied in practice when hoses are temporarily laid over a road and traffic must be able to continue to pass. Hoses for instance relate to water hoses for pumping away excess water, and fire hoses.

It is known in practice to use hose ramps, for instance in the case of flooding, wherein water has to be discharged. It is possible in this case that water hoses have to be laid over a road temporarily. A hose ramp is provided so as to allow traffic to pass and so as not to damage hoses. Such a hose ramp comprises a profile in which a hose lies or through which a hose is carried. The hose ramp is further provided with ramp plates so that the vehicle can travel over the hose ramp without damaging the hose and/or the vehicle.

A limitation of a hose ramp which occurs in practice is the limited ground clearance of vehicles. It must be prevented that a vehicle, its front wheel having passed over the hose ramp, is not yet positioned with its rear wheel on the hose ramp and its underside thereby comes into contact with the upper side of the profile. This could result in damage to the vehicle. In addition, the hose ramp can hereby be moved out of position, during which the hose can for instance become damaged.

For this purpose it is known in practice to provide the profile with an oval channel or passage, so that a hose with reasonably large dimensions can still be laid over the road. The profiles for the hose ramp are here in practice provided with a larger bottom surface compared to the upper surface. The hose ramp hereby remains positioned on the ground in the desired manner, and the ramp will not be displaced by the hose in combination with the pressure of the liquid being carried through the hose.

It is further a common occurrence in practice that the profile of the hose ramp, and with this also the hose ramp itself, is as it were lifted up and can come away from the ground. This is usually caused close to the outer end of the profile, where the shape of the hose changes. The hose undergoes a change of shape here from the oval shape in the hose ramp to the common (free) cylindrical hose shape when exiting the profile. This may result in dangerous situations in that the hose with profile may start to move and come into contact with persons or goods. The effective ground clearance of the hose ramp also becomes a problem due to the lifting up of the profile. This increases the chance of damage.

The above stated problems are exacerbated by the wish to use larger hoses and optionally higher pressures. This occurs particularly in hoses greater than 6 inches, so for instance 8-inch, 10-inch inch and 12-inch hoses. This is exacerbated further at larger pressures of up to 3 bar, 4 bar or even higher, for instance about 12 bar.

The present invention has for its object to obviate or at least reduce the above stated problems, such that larger hoses and/or higher pressures can be applied by means of hoses in combination with the profile according to the invention.

The invention provides for this purpose a profile for a hose ramp, wherein the profile comprises:

a housing with a bottom part which rests on a ground surface during use, a first outer end provided with a first exit plane, and a second outer end provided with a second exit plane;

a channel extending through the housing from the first exit plane to the second exit plane and configured for passage of a hose, wherein the channel is substantially provided with an oval shape, wherein the first exit plane is provided at a first angle to the bottom part and the second exit plane is provided at a second angle to the bottom part, and wherein the first and second angle differ from each other.

The profile can be manufactured from diverse materials, including aluminum, iron, steel, plastic and other suitable materials. The hose for instance relates to a water hose and is used for pumping away excess water. The hose can also relate to fire hoses and other types of hose for pumping liquid in particular.

By providing an oval shape for the throughfeed channel or throughfeed space a hose with a relatively large diameter can be placed in the oval shape, such that the desired ground clearance can be maintained. The outer end in longitudinal direction of the profile is further provided with a first exit plane and a second exit plane on the other side, between which said channel extends. These exit planes are used for feeding the hose into or out of the profile. The exit planes are provided at an angle to the bottom part.

The exit planes are preferably provided at an angle of between 0° and 90°, although one of the two angles can if desired also be a right angle, i.e. an angle of 90°. By providing an angle it is however achieved that the bottom surface is greater than the upper surface, and a stable positioning of the profile is ensured in practice. In addition, by providing an exit plane at an angle the transition from the forced oval shape of the hose in the channel to the more natural, free substantially round shape for the hose is as it were guided by the profile.

According to the invention, the first and second angles differ from each other. The profile hereby obtains an asymmetrical form, as seen in side view (longitudinal direction) of the profile.

The often two or more profiles are in practice positioned adjacently of each other in order to bring about a sufficiently wide passage for the traffic. The hose tends to bulge outward to some extent between two adjacent profiles, whereby these adjacent profiles may be lifted up and/or displaced. The combination of two different angles on the one hand preserves a good positioning of the profiles and on the other hand also ensures the guiding of the hoses. A hose with a relatively large diameter, for instance 8-inch, 10-inch or even 12-inch, can hereby be laid over a road in effective manner, wherein the bottom clearance can stay within current norms. Besides being used in the case of greater hose diameters, the profile according to the invention can likewise be used advantageously in handling of a higher pressure in the hose, as well as a combination of higher pressure and greater hose diameter. The asymmetrical profile according to the invention has been found to make this possible in effective manner.

If desired, it is possible to manufacture a hose ramp from the profiles according to the invention, wherein the asymmetrical profiles are provided at the outer ends. If more than two profiles are positioned adjacently of/behind each other, for instance in the case of a very wide road, a conventional symmetrical middle/intermediate profile, or even a plurality of intermediate profiles, can be applied if desired.

The profiles can be manufactured integrally, or from parts. It has particularly been found that a profile can advantageously be manufactured from two parts. This is advantageous for production, transport and manageability.

In an advantageous embodiment the profile according to the invention is further provided with a coupling element configured to be coupled to the coupling element of the adjacent profile during use of the profile.

By providing a coupling element a better stability can be obtained for the hose ramp manufactured from the profiles according to the invention. Said lifting up of the profile by large hoses and/or high pressures is hereby inter alia prevented.

The coupling element is preferably provided on or close to the side of the profile directed downward during use. This makes it easier to follow a ground surface which may be uneven. The coupling element can be embodied in diverse ways, including the use of hooks or other hook-like elements, straps such as connecting straps, press-studs, pin-hole connections or other suitable connections.

In an advantageous embodiment according to the invention the first angle lies in the range of 40° to 60°, preferably in the range of 40° to 50°, and lies most preferably in the range of 42° to 50°.

It has been found that said ranges provide an effective angle at which relatively great hose diameters and/or high pressures can be applied.

The second angle preferably lies in the range of 50° to 75°, preferably in the range of 55° to 70°, and most preferably lies in the range of 58° to 68°. It is noted here that the first angle is smaller than the second angle, and that combinations of said ranges are preferably applied. It has been found that such a combination can handle larger diameters and/or higher pressures even more effectively.

In a further advantageous embodiment according to the invention at least one of the outer ends of the profile is provided, preferably on the longitudinal side, with a reflective and/or light-emitting element.

Providing a reflective and/or light-emitting element clearly shows a driver that there is a hose ramp, and the position where he is able to pass over it. This also gives an additional indication of the way in which profiles can be coupled to each other during assembly of the hose ramp.

The reflective and/or light-emitting element can be manufactured from a reflective material or can be provided with a lamp, for instance powered with a battery which, if desired, is charged with solar cells during the day. It will be apparent that this can also be embodied in other manner.

In a further advantageous embodiment according to the invention the profile is further provided with a transition guide, configured to guide the hose from a substantially oval cross-section to a substantially round cross-section.

By providing the transition guide the hose is gradually guided from the forced, oval shape in the channel of the profile to the more natural, round, free shape. Forces can hereby be controlled more effectively. Such a transition guide can be seen as an individual, separate part which, if desired, can be coupled to the profile according to the invention, or can alternatively be provided integrally therewith.

The invention further relates to a hose ramp comprising one or more profiles according to the invention, and is further provided with a number of ramp plates to enable the profile to be driven over.

The hose ramp according to the invention makes use of 1, 2, 3, 4 or even more profiles. In the case of more than two profiles, it is possible to choose, if desired, a conventional intermediate profile or intermediate profiles so as to realize a complete hose ramp therewith. The two smallest angles are preferably placed at the outer ends, and provided here with a reflective or light-emitting element. This simplifies assembly of the hose ramp as a whole because the reflective or light-emitting element gives the installer an additional indication as to how the hose ramp can be installed. This further indicates to a driver the positions between which the vehicle is able to travel over the hose. Safety is hereby further increased.

The ramp plates can be provided as conventional ramp plates and, if desired, be coupled to the profile. It is also possible to provide the ramp plates integrally with the profile, so that a ready-made module for the hose ramp is obtained.

The invention further also relates to a method for providing a hose ramp, the method comprising the steps of:

providing one or more profiles according to the invention;

positioning and optionally mutually coupling the one or more profiles on the ground surface;

arranging ramp plates; and arranging a hose.

The method provides the same effects and advantages as described for the profile and the hose ramp. The method according to the invention provides the option of being able to handle relatively large hoses and/or relatively high pressures, while a stable positioning for the hose ramp can still be achieved. A safe situation for traffic can also be provided. Additional intermediate profiles can optionally be provided.

Further advantages, features and details of the invention are further elucidated below on the basis of preferred embodiments thereof, wherein reference is made to the accompanying drawings, in which.

Figure 1:
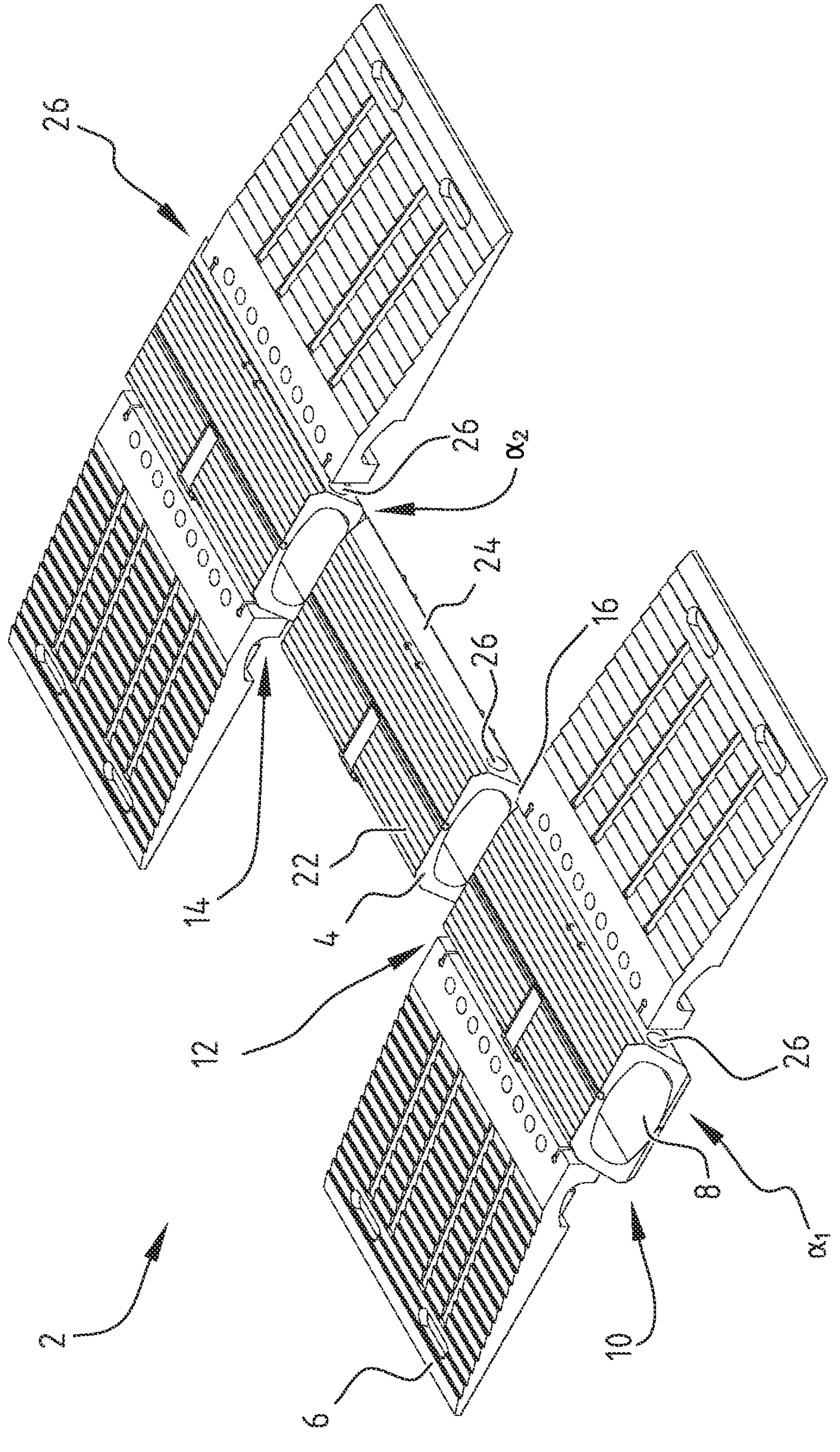
FIG. 1 is a view of a hose ramp with the profiles according to the invention.
Figure 2:
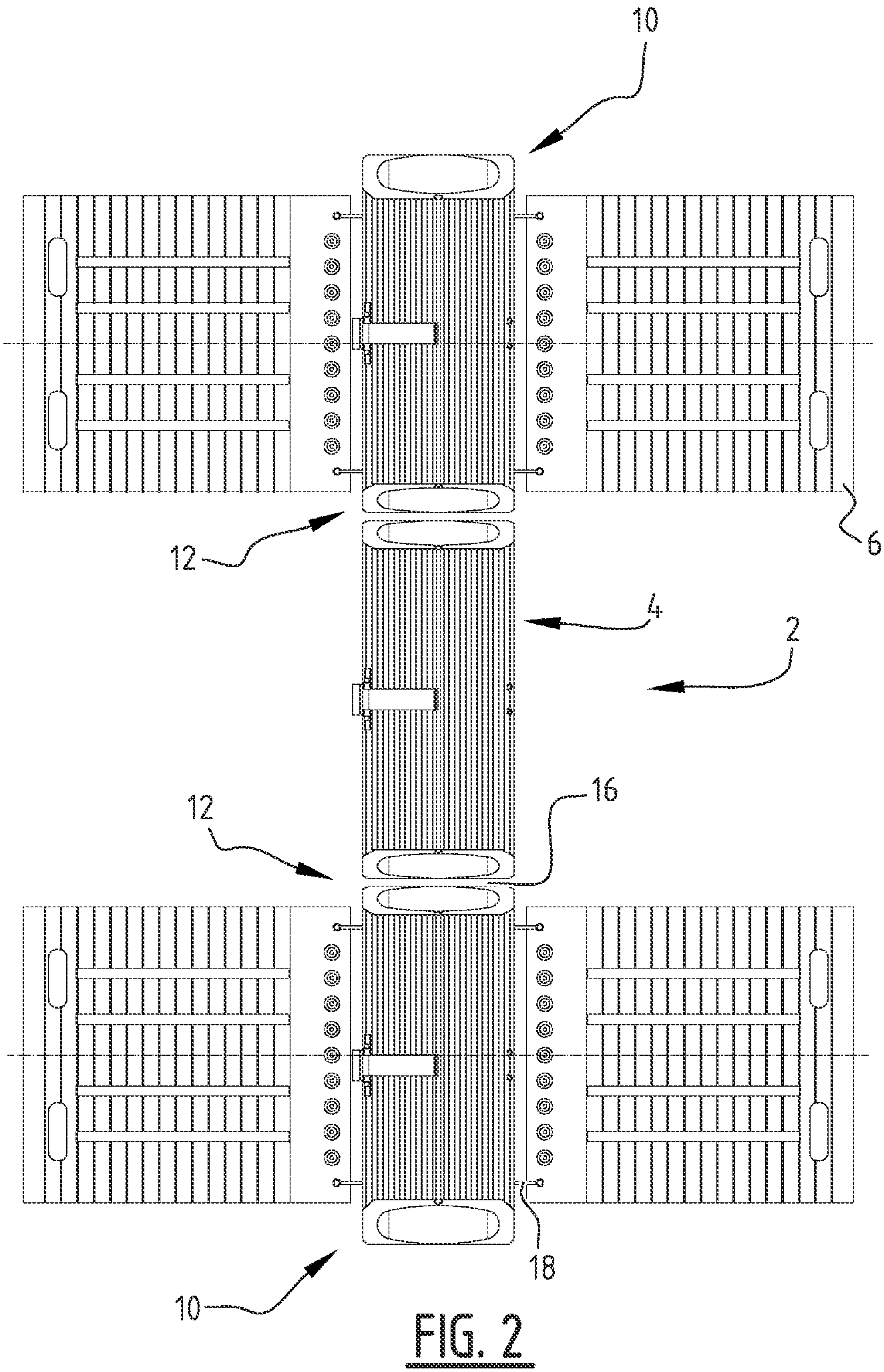
FIG. 2 is a top view of the hose ramp of FIG. 1.
Figure 3:
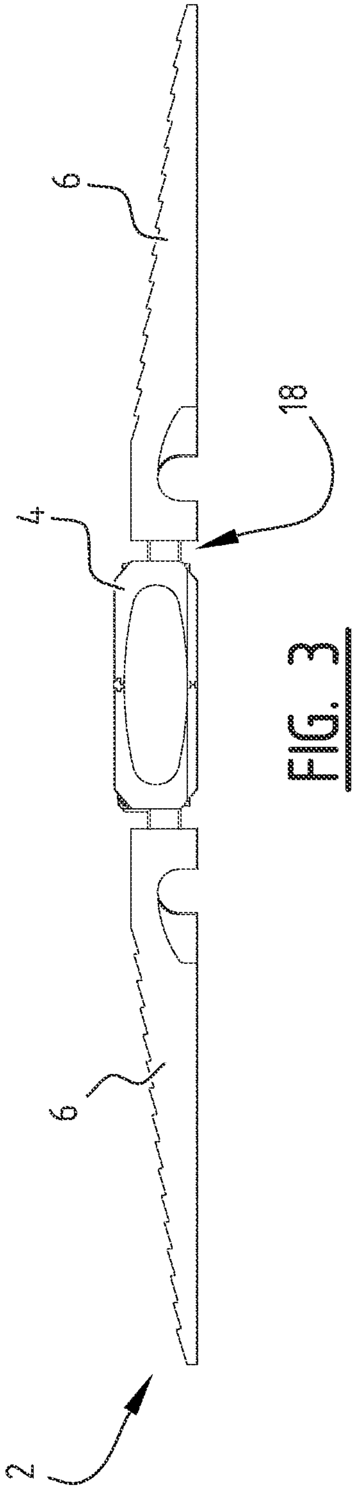
FIG. 3 is a cross-section of the hose ramp of FIGS. 1 and 2.
Figure 4:
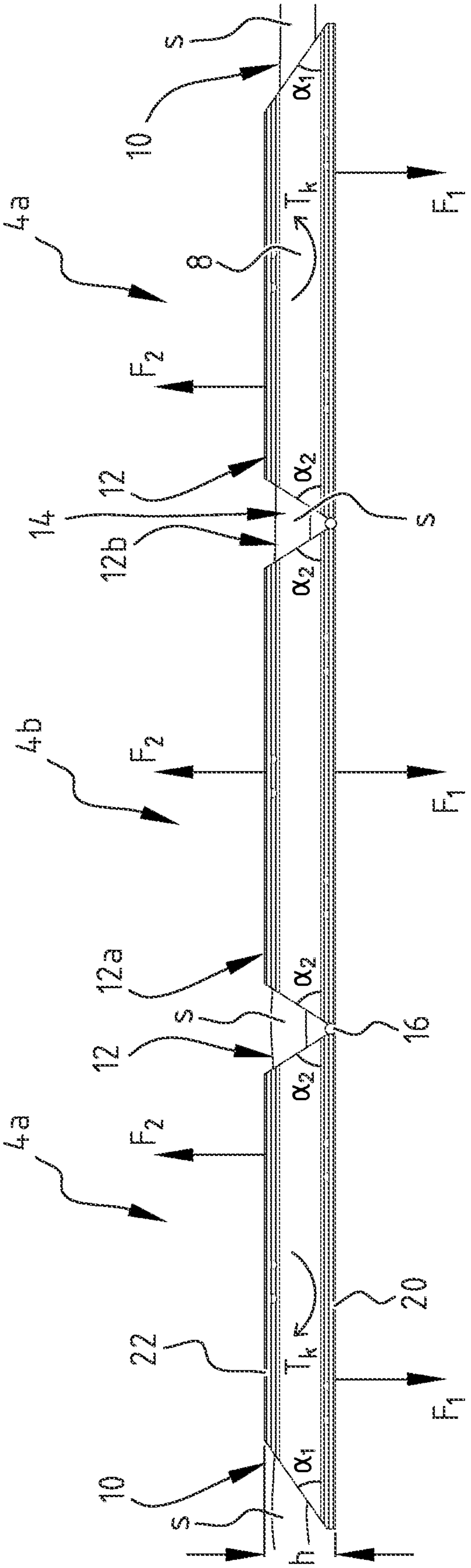
FIG. 4 is a longitudinal cross-section of the hose ramp of FIGS. 1 and 2.

Hose ramp 2 (FIGS. 1-4) comprises a number of profiles 4. Further provided are ramp plates 6 for enabling a vehicle to travel over profiles 4. In the shown embodiment channel 8 extends through or in the housing of profiles 4. Channel 8 thereby extends in longitudinal direction of profiles 4 and longitudinal direction of hose ramp 2. Hose S can be positioned in channel 8. For this purpose it can be carried, preferably while not in use, through channel 8. Upper side 22 of profile 4 can optionally be foldable or removable in order to simplify the positioning of hose S. Profile 4 is further provided with a first outer end with first exit plane 10 and a second outer end with second exit plane 12.

Profiles 4 are optionally positioned with a small intermediate space 14, wherein couplings 16 ensure the relative positions of adjacent profiles 4. In the shown embodiment couplings 16 are provided close to the ground during use.

In the shown embodiment ramp plates 6 are attached to profiles 4 using couplings 18. In a currently preferred embodiment ramp plates 6 are supplied separately and coupled with couplings 18 to profiles 4 in situ. It is also possible to provide couplings 18 more permanently and for instance arrange ramp plates 6 rotatably on profiles 4 so as to enable compact transport and storage. Profile 4 is further provided with bottom part 20, upper surface 22 and two side walls 24. In the shown embodiment two reflective and/or light-emitting elements 26 are further arranged at the outer ends of hose ramp 2 for the purpose of indicating assembly order and/or direction of travel or travel path for a driver.

Figure 5:
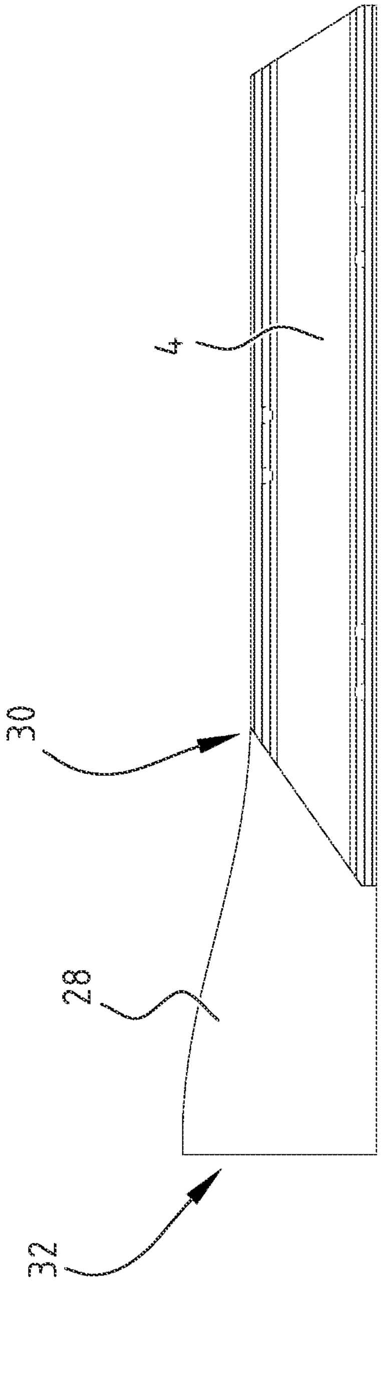
FIG. 5 is a side view of the optional hose guide for the profile according to the invention.

Additional guide 28, which is coupled with a first outer end 30 to profile 4 and is positioned freely with a second outer end 32 (FIG. 5), can optionally be provided. Hose guide 28 is provided at first outer end 30 with an oval shape substantially corresponding to the shape of channel 8 of profile 4. At second outer end 32 guide 28 is provided with a round shape substantially corresponding to the free, natural shape of hose S.

It will be apparent that different profile dimensions are possible. In the shown embodiment hose ramp 2 is provided with three profiles 4 which are positioned adjacently of each other so as to achieve sufficient length. The oval shape is chosen such that, in practice, ground clearance h prevents damage to vehicles and is still able to allow passage of hoses of sufficient diameter.

First outer end 10 is provided at angle $\alpha_1$ (FIG. 1 and FIG. 4) and second exit plane 12 is provided at a second angle $\alpha_2$. In the shown embodiment $\alpha_1$ is smaller than $\alpha_2$. $\alpha_1$ is thus for instance 45° and $\alpha_2$ is for instance 60°. These angles are defined between the oblique exit planes 10, 12 relative to bottom surface 20 of profile 4.

In the shown embodiment hose ramp 2 is provided with asymmetrical profile 4*a* (FIG. 4) on either side of hose ramp 2 and with conventional, symmetrical intermediate profiles 4*b* between these two outer ends 4*a*. In the case of symmetrical profile 4*b* downward forces $F_1$ and upward forces $F_2$ are in balance, and a lifting effect can remain limited, depending on the exit planes. In the shown embodiment profile 4*b* is provided with the relatively large angle $\alpha_2$.

In the same shown embodiment profiles 4*a* according to the invention take an asymmetrical form. This means that downward forces $F_1$ and upward forces $F_2$ are not in balance and a torque $T_k$ will thereby occur, this resulting in a lifting effect for profile 4*a*. This is caused by outward bulging of hose S between two adjacent profiles 4*a,b*, and where hose S exits at exit plane 10.

In the shown embodiment for hose ramp 2 (FIG. 4) intermediate profile 4*b* is provided with exit planes 12*a,b* with an angle $\alpha_2$ which is substantially equal to the angle $\alpha_2$ of asymmetrical profile 4*a*. It will be apparent that other embodiments are also possible here, for instance with different angles for intermediate profiles 4*b* and asymmetrical side profiles 4*a*.

Figure 6:
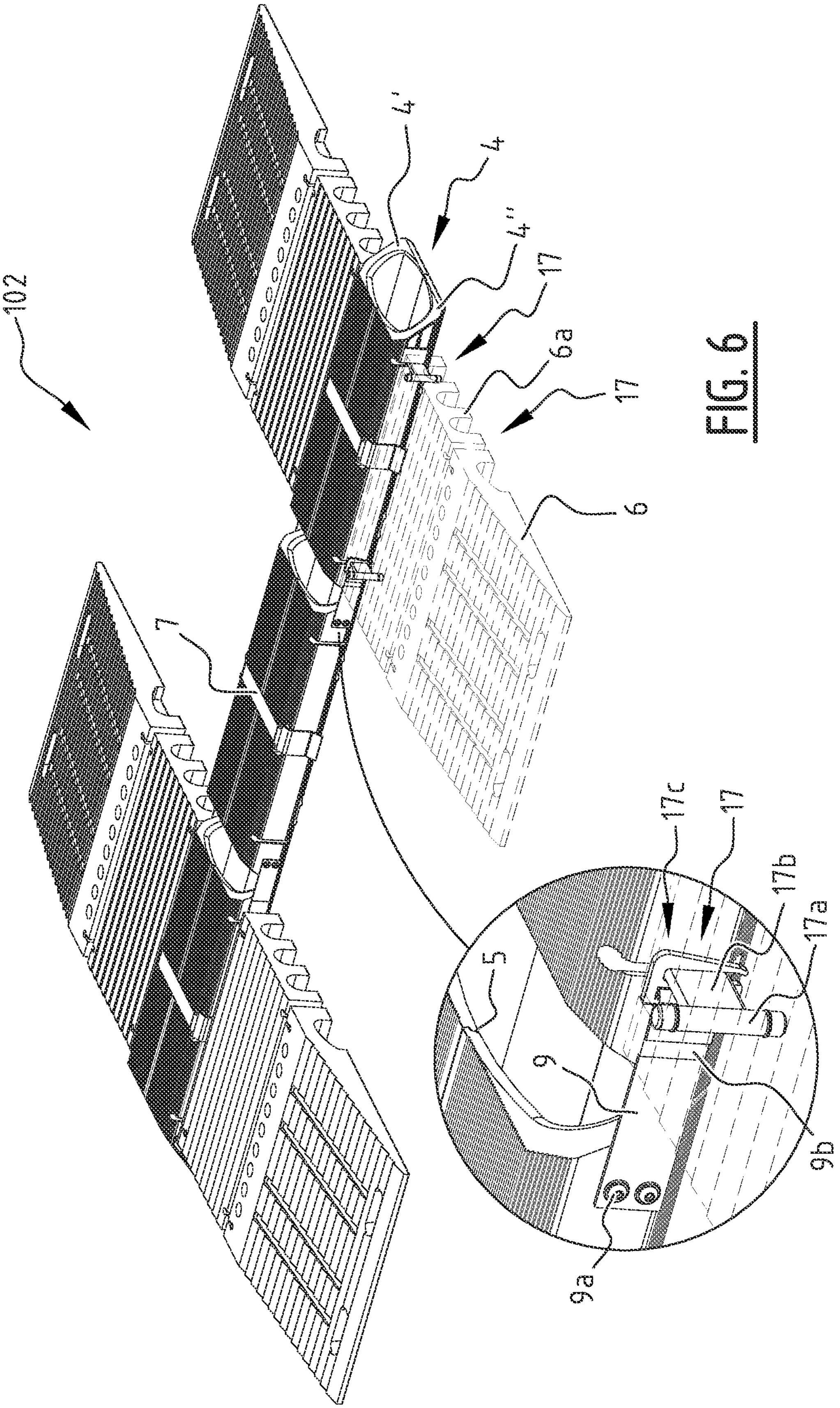
FIG. 6 is a view of a hose ramp in a further embodiment according to the invention.

In an alternative embodiment hose ramp 102 (FIG. 6) is provided with profiles 4, optionally provided from two profile parts 4', 4". Profile parts 4', 4" are connected to each other using form connection 5 and straps/belts 7. In the shown embodiment profiles 4 are mutually connected with straps/belts 9, bolts/press-studs 9*a* and buckle element 9*b*. It will be apparent that other connections are also possible according to the invention. Ramp plates 6 and optionally arranged auxiliary ramp plates 6*a* are connected to each other with couplings 17, as well as to profiles 4. In the shown embodiment coupling 17 is provided with pin 17*a*, strip 17*b* and coupling element 17*c*. It will be apparent that other couplings are also possible for this purpose according to the invention. In the shown embodiment profiles 4 are provided from aluminum. It is possible here to apply other materials and/or combinations.

For the purpose of placing hose ramp 2, 102 two asymmetrical side profiles 4*a* are supplied, as well as a number of intermediate profiles 4B, if desired. These are positioned on a roadway, wherein the asymmetrical profiles 4*a* are preferably directed with a smallest angle $\alpha_1$ toward an outer end. In the shown embodiment this orientation is made relatively simple for the installer by arranging reflective or light-emitting elements 26 at these outer ends. Adjacent profiles are coupled with coupling 9, 16. Hose S is carried through or placed in channel 8. Ramp plates 6 are then supplied and connected with couplings 17, 18 to profiles 4, 4*a*, 4*b*. After the correct positioning of hose ramp 2 hose S can be pressurized. Hose guide 28 is optionally provided at outer ends of hose ramp 2.

The present invention is by no means limited to the above described preferred embodiments thereof. The rights sought are defined by the following claims, within the scope of which many modifications can be envisaged.

The invention claimed is:

1. A profile for a hose ramp, comprising:

a housing with a bottom part which rests on a ground surface during use, a first outer end provided with a first exit plane, and a second outer end provided with a second exit plane; and a channel extending through the housing from the first exit plane to the second exit plane and configured for passage of a hose, wherein the channel is substantially provided with an oval shape, and wherein the first exit plane is provided at a first angle to the bottom part and the second exit plane is provided at a second angle to the bottom part, and wherein the first and second angle differ from each other.

2. The profile according to claim 1, the profile further comprising a coupling element configured to be coupled to a coupling element of an adjacent profile during use.

3. The profile according to claim 2, wherein the first angle lies in the range of 40° to 60°.

4. The profile according to claim 3, wherein the second angle lies in the range of 50° to 75°.

5. The profile according to claim 2, wherein the coupling element is provided on or close to the side of the profile directed downward during use.

6. The profile according to claim 5, wherein the coupling element comprises at least one from the group of: hook element, strap, press-stud, pin-hole connection.

7. The profile according to claim 2, wherein the coupling element comprises at least one from the group of: hook element, strap, press-stud, pin-hole connection.

8. The profile according to claim 1, wherein the first angle lies in the range of 40° to 60°.

9. The profile according to claim 8, wherein the second angle lies in the range of 50° to 75°.

10. The profile according to claim 1, wherein the second angle lies in the range of 50° to 75°.

11. The profile according to claim 1, wherein at least one of the outer ends of the profile is provided with a reflective and/or light-emitting element.

12. The profile according to claim 1, further comprising a transition guide configured to guide the hose from a substantially oval cross-section to a substantially round cross-section.

13. The profile according to claim 1, wherein the profile is provided from two profile parts.

14. The profile according to claim 1, wherein the first angle lies in the range of 40° to 50°.

15. The profile according to claim 1, wherein the first angle lies in the range of 42° to 50°.

16. The profile according to claim 1, wherein the second angle lies in the range of 55° to 70°.

17. The profile according to claim 1, wherein the second angle lies in the range of 58° to 68°.

18. A hose ramp comprising one or more profiles that comprise:

a housing with a bottom part which rests on a ground surface during use, a first outer end provided with a first exit plane, and a second outer end provided with a second exit plane;

a channel extending through the housing from the first exit plane to the second exit plane and configured for passage of a hose, wherein the channel is substantially provided with an oval shape, wherein the first exit plane is provided at a first angle to the bottom part and the second exit plane is provided at a second angle to the bottom part, and wherein the first and second angle differ from each other; and a number of ramp plates attached to the profiles.

19. A hose ramp according to claim 18, the profile further comprising a coupling element configured to be coupled to a coupling element of an adjacent profile during use, wherein the first angle lies in the range of 40° to 60°, and wherein the second angle lies in the range of 50° to 75°.

20. A method for providing a hose ramp, comprising the steps of:

providing one or more profiles comprising:

a housing with a bottom part which rests on a ground surface during use, a first outer end provided with a first exit plane, and a second outer end provided with a second exit plane;

a channel extending through the housing from the first exit plane to the second exit plane and configured for passage of a hose, wherein the channel is substantially provided with an oval shape, wherein the first exit plane is provided at a first angle to the bottom part and the second exit plane is provided at a second angle to the bottom part, and wherein the first and second angle differ from each other, positioning and mutually coupling the one or more profiles on the ground surface;

arranging ramp plates to the profiles; and arranging a hose within the channel.

* * * * *